United States Patent [19]

Johnson

[11] Patent Number: 4,724,738
[45] Date of Patent: Feb. 16, 1988

[54] SPACE ENTRY ACTUATOR LAUNCH SYSTEM

[75] Inventor: Don E. Johnson, Mesa, Ariz.
[73] Assignee: Johnson Family Enterprises, Mesa, Ariz.
[21] Appl. No.: 854,854
[22] Filed: Apr. 22, 1986
[51] Int. Cl.[4] .......................... B64G 1/40; F41F 3/07
[52] U.S. Cl. ..................................... 89/1.809; 244/63; 244/172
[58] Field of Search .................... 89/1.8, 1.809, 1.815, 89/1.816, 1.819, 1.818; 244/172, 63

[56] References Cited

U.S. PATENT DOCUMENTS

| | | | |
|---|---|---|---|
| 3,007,372 | 11/1961 | Baxter | 89/1.8 |
| 3,077,143 | 2/1963 | Draim et al. | 89/1.809 |
| 3,093,033 | 6/1963 | Draim et al. | 89/1.809 |
| 3,134,300 | 5/1964 | Schlesinger, Jr. | 89/1.819 |
| 3,135,162 | 6/1964 | Kamalian | 89/1.810 |
| 3,137,203 | 6/1964 | Brown | 89/1.810 |
| 3,158,062 | 11/1964 | Feiler | 89/1.810 |
| 3,166,979 | 1/1965 | Draim | 89/1.809 |
| 3,181,422 | 5/1965 | Draim | 89/1.809 |
| 3,245,318 | 4/1966 | Finkelstein et al. | 89/1.809 |
| 3,249,014 | 5/1966 | Daughenbough | 89/1.809 |
| 3,340,767 | 9/1967 | Penza | 89/1.809 |
| 3,363,508 | 1/1968 | Stahmer | 89/1.818 |
| 3,513,750 | 5/1970 | Penza | 89/1.809 |
| 3,929,306 | 12/1975 | Faget | 244/162 |
| 4,344,592 | 8/1982 | Constantinescu | 89/1.805 |
| 4,451,017 | 5/1984 | Marshall | 244/172 |
| 4,452,412 | 6/1984 | von Pragenau | 244/172 |

Primary Examiner—David H. Brown
Attorney, Agent, or Firm—Gausewitz, Carr & Rothenberg

[57] ABSTRACT

A launching system is provided having a launch cylinder with an open bottom and propulsion means in the form of a rocket motor attached within the cylinder adjacent the top thereof. The cylinder is formed of a lightweight material which floats with a substantial portion thereof beneath the surface of the sea. The spacecraft is attached to the upper end of the cylinder in a vertical position for launching. Water cooling apparatus is provided for cooling the cylinder walls in proximity to the exhaust gases. On initial firing of the rocket motor, the hot exhaust gases from the rocket motor are confined therebelow and create expanding pressure within the cylinder in the space above the water surface, while generating steam, which also expands, thus lifting the cylinder and spacecraft from the water until approximately three-quarters of the cylinder is out of the sea. Thereafter, the engines of the spacecraft are ignited, while release of the craft from the cylinder is effected. Further rise of the cylinder may be inhibited to preclude the cylinder from breaching the surface by a combination of flare pods at the trailing end of the cylinder and reverse thrust rockets, with a parachute package slowing its descent back into the sea.

38 Claims, 11 Drawing Figures

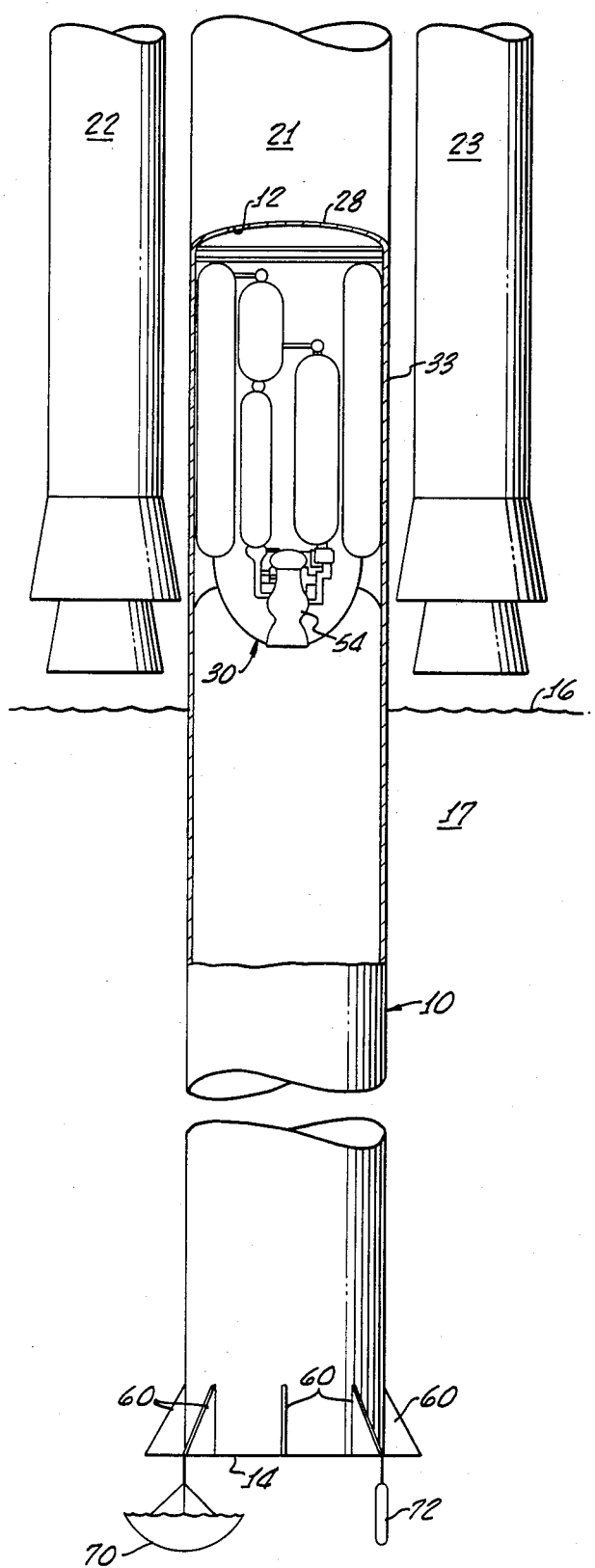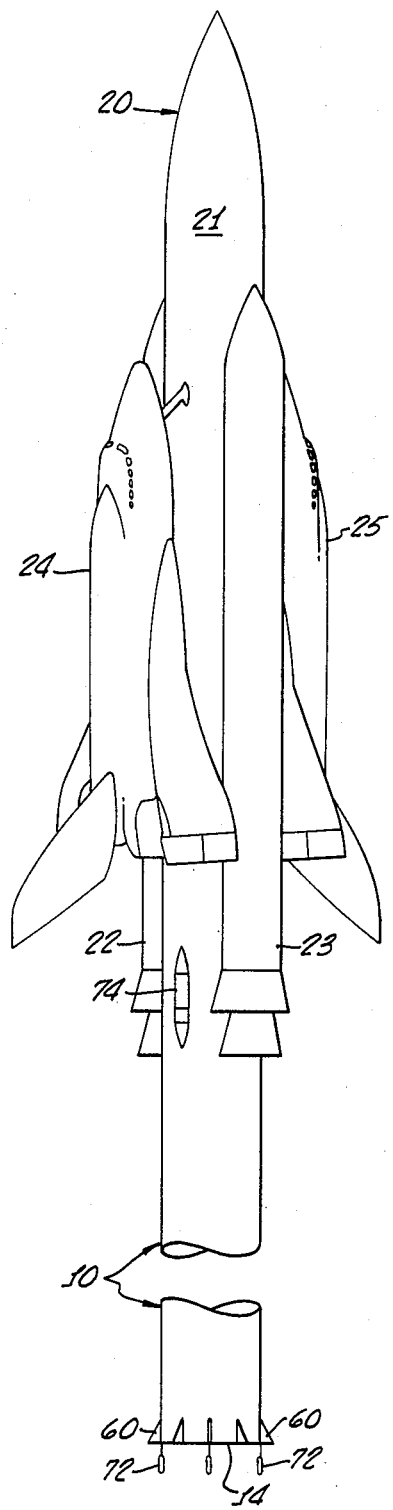

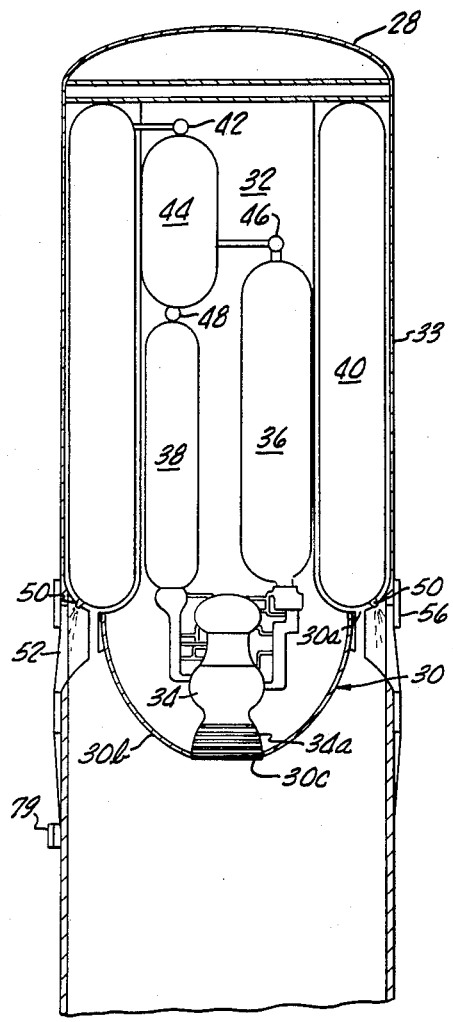
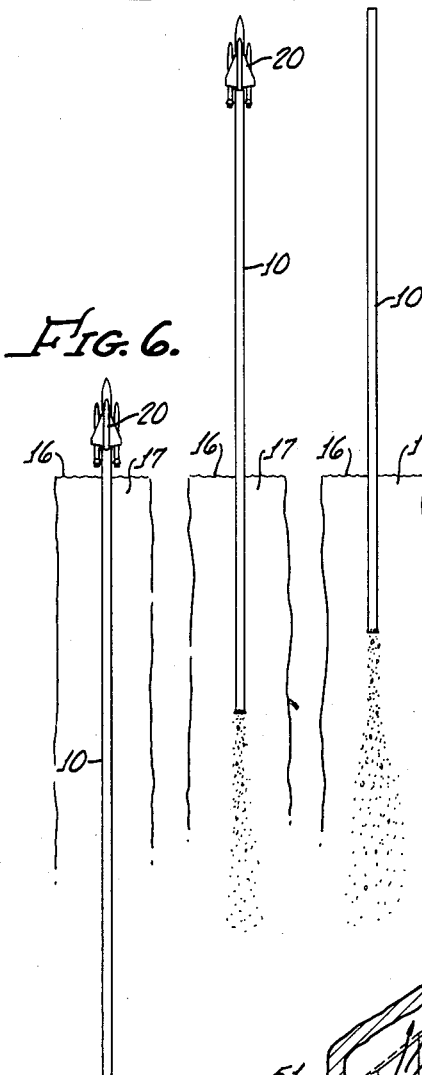
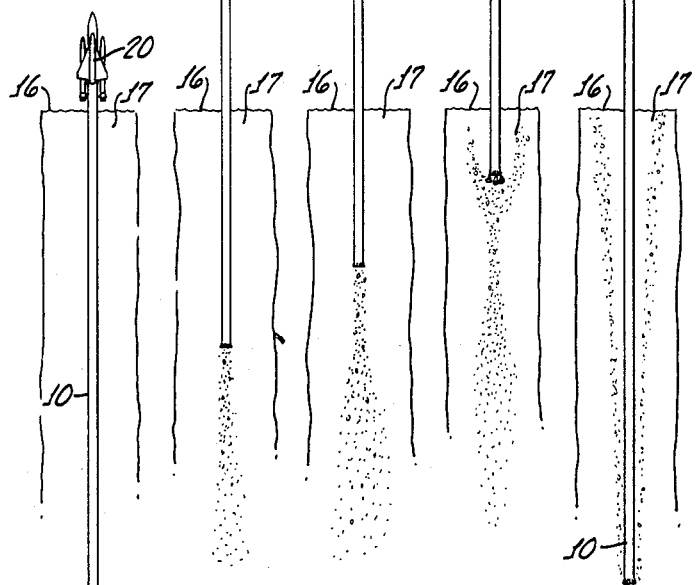
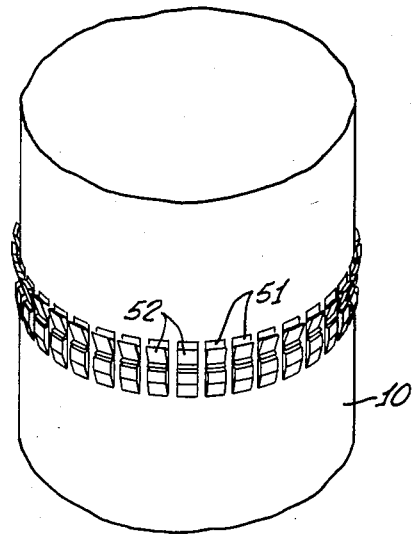
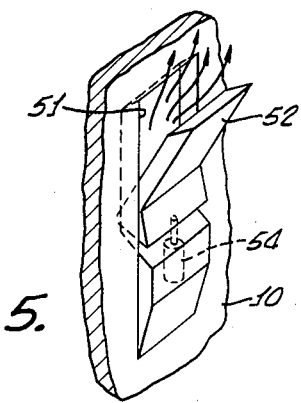

SPACE ENTRY ACTUATOR LAUNCH SYSTEM

BACKGROUND OF THE INVENTION

The background of the invention will be discussed in two parts:

FIELD OF THE INVENTION

This invention relates to missile and spacecraft launch systems, and more particularly, to a water-based system for launching manned or unmanned missiles and spacecraft.

DESCRIPTION OF THE PRIOR ART

The launching of guided manned or unmanned missiles or spacecraft, particularly from land-based launch systems, has required the expenditure of an enormous amount of liquid propellant fuel in the one or more booster stages that lift the spacecraft from the launch pad to an altitude or speed at which subsequent stages are fired for propelling the craft into space, or into earth orbit. Such booster rockets are attached to the spacecraft, with the weight of the booster rockets and fuel load adding to the total weight of the system to be launched. Such booster rockets are separable from the spacecraft after launch. With land-based launch systems, such booster rocket launchers are extremely inefficient, relying on the mass velocity of the exhaust gases generated by the high temperature of combustion for the thrust of the rockets required for launching the spacecraft to an altitude and at a speed required for second stage rocket firing.

Land launching of spacecraft has been fuel inefficient and control costly because of two major factors, these being the thermodynamic value of the rocket fuel which is used only to create exhaust velocity, and the inability to aerodynamically control the vehicle being launched for a significant period of time after launch. The long term costs of space entry systems are most sensitive to the fuel costs of the launch sequence, with sixty percent of the total fuel required for space entry being expended in the first stage of the launch process. In addition, hardware costs for guidance systems that operate during prelaunch and early launch conditions for land based space entry programs are very complex and expensive.

Some attempts have been made at obtaining economic efficiency by the use of reusable rocket launcher units. One such early apparatus is shown and described in U.S. Pat. No. 3,007,372, issued Nov. 7, 1961, to Baxter for a "Recoverable Rocket Launching Unit", in which a rocket launching unit is attached to the rear of a rocket, the unit serving as a primary stage and being propeller driven for initial and accelerating thrust. The unit is then jettisoned at a predetermined speed or altitude, and may be recovered for reuse.

Another land-based rocket launching system is shown and described in U.S. Pat. No. 3,134,300, entitled "Method and Apparatus for Rocket Launching", issued to Schlesinger, Jr. on May 26, 1964, the apparatus including a rocket sled operable on a track having a descending section, a generally level section, and then an ascending section at the desired launch angle. The missile is attached to the sled, with the engine of the sled providing the initial momentum on the descending portion, with the missile rocket fired by a trip mechanism at a certain point of movement of the sled, with separation of the missile from the sled thereafter.

U.S. Pat. No. 3,363,508, is directed to another launch system, and is entitled "Rocket Launcher", such patent being issued to Stahmer on Jan. 16, 1968, the system having a launch tube with a launch platform therein supporting the rocket, the platform being driven upwardly by cables attached to series wound motors for assisting in lift off.

U.S. Pat. No. 3,929,306, entitled "Space Vehicle System", issued to Faget et al on Dec. 30, 1975, such patent illustrating a space vehicle system consisting of an orbiter vehicle having an expendable propellant tank attached to the undersurface thereof.

Another launch apparatus is shown and described in U.S. Pat. No. 4,344,592, issued to Constantinescu, on Aug. 17, 1982, such patent being entitled "Launching Tower for Heavy Rockets", the tower including a longitudinally movable piston on which the rocket is placed, the piston being actuated upwardly by rocket motors within the tower structure to provide an initial acceleration to the rocket upon separation of the piston from the rocket, whereupon the so-launched rocket has its engines fired.

A multi-stage rocket system is shown and described in U.S. Pat. No. 4,451,017, issued May 29, 1984 to Marshall, such patent being entitled "Three Stage Rocket Vehicle with Parallel Staging".

A space shuttle system having an orbiter spacecraft with multiple stages and fuel tanks is shown and described in U.S. Pat. No. 4,452,412, issued June 5, 1984, to von Pragenau.

A launch system for a submarine is shown and described in U.S. Pat. No. 3,317,203, issued to Brown, on June 16, 1964, and is entitled "Underwater Missile Launching System", the system including a housing or pod in which a missile is situate, the pod being released from the submarine, with means for maintaining the pod in a submerged position for a time period to allow the submarine to move a distance away prior to firing of the missile within the pod.

Another water based launch system is shown and described in U.S. Pat. No. 3,135,162, issued to Kamalian on June 2, 1964, entitled "Water-Borne Missile Launcher", the launcher including an enclosure for housing a missile, the enclosure having compartments for selective ballasting to enable towing of the enclosure in a horizontal position, and then reballasting the enclosure to a vertical position for firing. One end of the enclosure is removable and means are provided for causing the launching enclosure to maintain its position in the water when the missile commences to leave the launching device.

Another such water borne launcher is shown and described in U.S. Pat. No. 3,158,062, entitled "Missile Container and Launcher", issued to Feiler on Nov. 24, 1964, the apparatus utilizing an enclosure for housing the missile during transport and orientation with an explosively removed upper cover for enabling launch of the missile therefrom, with the enclosure anchored within the water.

The prior art has focused on the use of boosters or auxiliary rockets, separable from the missile or spacecraft sometime after launch at a certain speed or altitude. Other land based systems have attempted to use auxiliary devices such as towers with rockets, and motor-operated devices for providing initial vertical displacement of the missile.

It is an object of the present invention to provide a new and improved water-based space entry launch system.

It is another object of the present invention to provide a new and improved sea launch system for spacecraft.

It is a further object of the present invention to provide a new and improved sea launch system employing an open-ended cylinder for confining gas generation to increase the efficiency of conversion of fuel to thrust.

It is still another object of the present invention to provide a new and improved sea launch system for boosting spacecraft to a predetermined altitude utilizing a rocket-powered open-ended cylinder.

It is yet another object of the present invention to provide a new and improved method for launching a missile or spacecraft from the sea to a predetermined altitude prior to activation of propulsion systems attached to the spacecraft.

SUMMARY OF THE INVENTION

The foregoing and other objects are accomplished by providing a launching system having an open bottom end launch cylinder with propulsion means in the form of a rocket motor attached within the cylinder adjacent the top thereof. An annular water cooling assembly is included in the rocket motor compartment for cooling the walls of the cylinder therebelow during launch. The cylinder is formed of a lightweight material which floats with a substantial portion thereof beneath the surface of the sea. The length of the cylinder beneath the sea corresponds to the desired altitude and speed necessary for lifting the spacecraft to a point required for firing of its own propulsion systems. The spacecraft is attached to the upper end of the cylinder in a vertical position for launching. On initial firing of the rocket motor of the cylinder, the hot exhaust gases from the rocket motor operate within a confined space to create thrust, while creating expanding pressure within the cylinder in the space above the water surface by generation of steam from the sea water and the water surface by generation internal walls of the cylinder, which also expands, thus lifting the cylinder and spacecraft from the water until approximately three-quarters of the cylinder is out of the sea. Thereafter, the engines of the spacecraft are ignited, while release of the craft from the cylinder is effected. Further rise of the cylinder is inhibited to preclude the cylinder from breaching the surface by a combination of flare pods at the trailing end of the cylinder and reverse thrust rockets, with a parachute package slowing its descent back into the sea.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 is a side elevational view, partially broken away, of the space entry actuator launch system in accordance with the present invention;

FIG. 2 is a side elevational view, partially broken away, of the system of FIG. 1 with a spacecraft payload thereon ready for launch;

FIG. 3 is an enlarged side elevational view, partially broken away, of the upper end of the launch system of FIG. 1;

FIG. 4 is a partial perspective view of the launch cylinder illustrating the pressure relief port and door arrangement about the periphery of the launch cylinder;

FIG. 5 is an enlarged perspective view of one of the pressure relief ports and doors of FIG. 4;

FIG. 6 is a reduced scale view of the launch system in a pre-launch position;

FIG. 7 is a reduced scale view of the launch system in pre-launch ascent;

FIG. 8 is a reduced scale view of the launch system at the moment of firing of the rocket boosters of the spacecraft payload;

FIG. 9 is a reduced scale view of the launch system as the launch cylinder reaches the peak of its travel; and FIG. 10 is a reduced scale view of the launch system during launch cylinder descent.

DESCRIPTION OF THE PREFERRED EMBODIMENT

Figure 11:
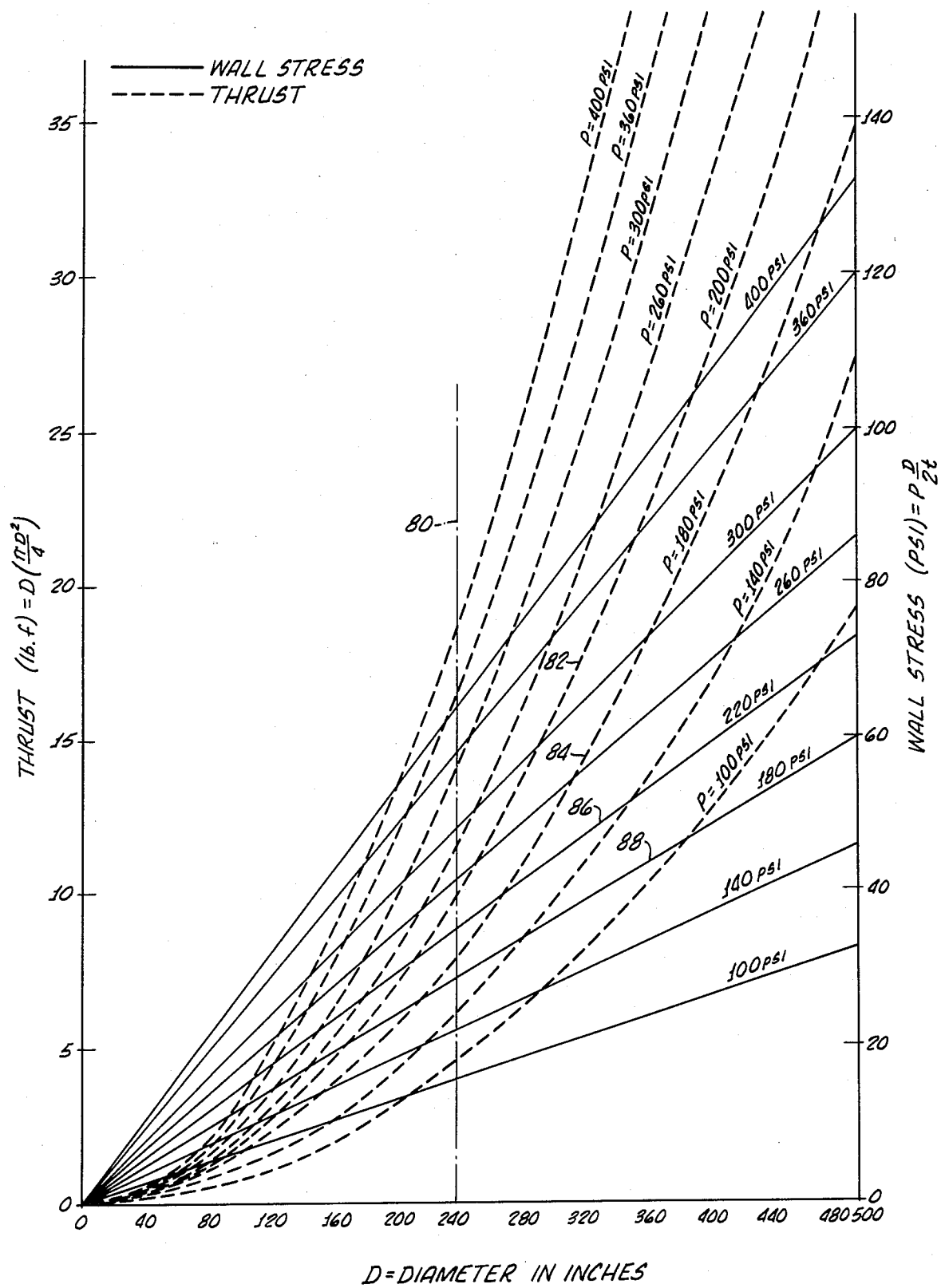
FIG. 11 is a graph depicting the thrust and wall stress as a function of the internal pressure and the diameter of cylinder of the launch system of FIG. 1.

Referring now to the drawings, and particularly to FIGS. 1 through 3, there is shown a launch system which includes a launch cylinder 10 having first and second ends 12 and 14, the lower end 14 of which is open. The cylinder 10 is positioned vertically in such a manner that its upper end portion 12 protrudes above the surface 16 of the ocean or sea 17.

The launch cylinder 10 is constructed in such a manner that the specific gravity thereof is approximately 1.0, that is, it will be slightly buoyant in sea water. The cylinder 10 is formed of a lightweight, pressure-resistant, heat-resistant material, and the cylinder 10 may be partially or substantially fabricated on site, that is, at sea where it is to be used. The lower end 14, which includes tail fins 32, may be formed of a cylinder of stainless steel, with the balance of the cylinder being formed, for example, of a filament wound material to provide the desired overall specific gravity necessary for partial flotation, while providing the temperature and pressure resistance needed for the cylinder 10. By way of example, the cylinder 10 may be fabricated by use of a composite material made up of a thin layer of carbon fibers in a matrix of high temperature epoxy overwound with Kevelar fibers in a matrix of water resistant epoxy. Inserted between certain layers of the Kevelar windings are hollow ceramic ribs to increase rigidity and buoyancy. The stainless steel lower end 14, being heavier than the remainder of the cylinder 10, assists in providing a low center of gravity so that the cylinder 10 will remain vertical within the sea 17 under all conditions.

The length of the cylinder 10 is equal to or greater than the altitude or elevation desired for boosting a missile or spacecraft to a point at which the propulsion systems of the missile or spacecraft are fired. For example, the length of the cylinder 10 may be 4,250 to 5,000 feet with a diameter of about twenty feet. The rocket launch system's payload, generally designated 20, to be launched, as shown in the drawings, includes a missile 21, having first and second solid fuel rocket boosters 22, 23, and first and second shuttle spacecraft 24, 25. The spacecraft 24, 25 are to be propelled into space orbit by ignition of the rocket boosters 22, 23, which, after the fuel thereof is expended, separate from the spacecraft 24, 25. Such a spacecraft arrangement is similar to that shown in U.S. Pat. No. 3,929,306, entitled "Space Vehicle System", issued to Faget et al on Dec. 30, 1975, such patent being hereinabove described.

In accordance with the present invention, the system will lift the rocket system's payload 20 to an aerodynamic speed of more than Mach 0.5, and to an altitude in excess of 2,000 feet above sea level, without using any of the rocket fuel of the payload 20. In addition, the system also provides stability for the rocket system's payload 20 during the first few critical seconds of flight. After achieving the desired altitude and speed, the rocket system's payload 20 separates from the cylinder 10, whereupon the rocket boosters 22, 23 are fired for the second stage of the launch of the shuttles or spacecraft 24, 25, at which point, the guidance systems of the rocket system's payload 20 will take over the trajectory and orbit control function.

As shown in FIGS. 1 and 3, the upper portion 12 of launch cylinder 10 is closed at its upper end with a launch platform 28, with a lower wall structure, generally designated 30, including an annular portion 30a and an inverted pressure dome portion 30b, defining a compartment 32 for supporting the necessary launch and cooling apparatus, the wall structure 30 extending across the interior wall of the cylinder 10. The outer wall of the cylinder 10 about the compartment 32 is provided with an ablative shield 33. The shield 33 covers about the top 100 feet of the cylinder 10 10, and is preferably formed as a flotation skirt made up of hollow ceramic beads molded in an ablative resin, the flotation skirt or shield 33 serving to furnish protection from hot separation gases as will be hereafter described. The launch and cooling apparatus includes gas generating means in the form of an actuator rocket motor 34 mounted generally centrally within the lower end of the compartment 32. The center portion of the pressure dome 30b is provided with an opening 30c through which extends the nozzle 34a of the rocket motor 34. An oxidizer tank 36 and fuel tank 38 are mounted within the compartment 32 and connected to the rocket motor 34 by suitable pipe couplings for operation thereof. The rocket motor 34 is mounted on the axial centerline of the cylinder 10 with the thrust thereof directed downwardly toward the surface of the sea 17. The lower wall structure 30 also acts as a pressure confining means for directing the force of the rocket motor 34 downwardly. Also included, although not fully shown, are the necessary support systems such as valves, plumbing, pumps, controls and the like.

Within the compartment 32, adjacent the walls of cylinder 10 therein, the apparatus includes cooling means operable during launch to assist in cooling the interior wall beneath the nozzle 34a of the rocket motor 34. The cooling means includes an annular water tank 40, coupled through a pressure control valve 42 to a high pressure gas tank 44, which preferably contains an inert gas, such as helium. The tank 44 may also be used to assist in the transmission of the oxygen and liquid fuel by pressure control valve connections 46 and 48, respectively connected to the tanks 36 and 38. The lower end of the annular water cooling tank 40 is provided with a controllable annular nozzle assembly 50 which directs the cooling water outwardly, that is, toward the interior walls of the cylinder 10 in the space intermediate the peripheral edge of the inverted dome portion 30b of the compartment 32 lower wall structure 30. This annular nozzle assembly 50 provides a film of cooling water on the interior walls which, along with the sea water contained therein, generates steam during the launch.

By referring also to FIGS. 4 and 5, the periphery of launch cylinder 10, immediately below the edge of the wall structure 30 of the compartment 32, is provided with pressure relief means, such pressure relief means including a plurality of circumferentially aligned pressure relief ports 51, each of which includes a generally rectangular opening with a cover or door 52, hinged at the lower edge thereof to the wall of the cylinder 10. Immediately therebelow, pneumatic actuators 54 are coupled for operation of the doors 52 of the relief ports 51 to a closed position as required to control cylinder descent. As will be hereafter described, the relief ports 51 serve to assist in separation of the launch cylinder 10 from the payload. During launch, the doors 52 of the relief ports 51 must be kept closed to confine the gas generation within the cylinder 10. For this purpose, a composite band 56 (See FIG. 3) encircles the cylinder 10 about the upper ends of the doors 52 of the relief ports 51, the band 56 including shaped charge explosive devices located between adjacent doors 52. The band 56 is formed of a flammable composite material which burns rapidly in the atmosphere once it is ignited by the shaped charge.

At the lower end 14 of the launch cylinder 10, equiangularly disposed tail fins 60 are provided about the periphery thereof, and such fins 60 may be provided with controllable trim tabs. As shown in FIG. 1, in depending relation to the end 14 of the cylinder 10, are sea chutes 70 and 72, with chute 70 shown in the open position, and chute 72 shown in the closed position. As will be described hereafter, these sea chutes provide drag when required during the launch sequence. In addition, the upper end 12 of the cylinder 10 is provided on the outer periphery thereof with two or more sub-housings, such as sub-housing 74, which include therein, as required for the particular mission, reverse rockets, and selectively deployable parachute assemblies.

With the cylinder 10 positioned in the sea 17, the payload 20 is then mounted on the launch platform 28 by conventional means such as pins and sockets, which hold the payload 20 to the platform 28 until separation altitude is achieved. The payload 20 is preferably arranged with the center of gravity thereof in axial alignment with the cylinder 10. Aerodynamically, the payload 20 has the control portions thereof trimmed to fly in a vertical path. To assist in the buoyancy of the upper end 12 of the cylinder 10 with the payload 20 attached, the cylinder 10 is provided with a fitting 79 at a convenient location below the compartment 32, to which may be attached means (not shown) for filling the upper end of the cylinder below the wall structure 30 with air pressure from a compressed air source. This forces the water inside the cylinder 10 to descend proportional to the total weight of the payload 20 which results in a cushion of air between the rocket motor 34 and the surface of the water inside the cylinder 20.

This arrangement creates a fuel-efficient launch system in which the exhaust gases from the rocket motor 34 operate within a confined, expanding volume, below the pressure dome 30, thus providing maximum upward thrust for lifting the payload 20. With the cushion of air, at a pressure greater than ambient air, along with the cooling water from the annular cooling water tank 40, the hot exhaust gases of the rocket motor 34 can expand the air within the confined area therebelow much faster and to a greater volume because of the difference in the latent heat of evaporation of water (950 BTU/lb.) and the already gasified air (80 BTU/lb.). The cooling water from the tank 40 is all turned to steam by the heat of the rocket motor 34 exhaust gases, so the total gases that are expanded inside the cylinder 10 are a combination of sea water inside the cylinder 10 flashed into steam by the deflected exhaust gases, cooling water produced steam, rocket motor 34 exhaust gases, and air pumped into the cylinder 10 to correct for the weight of the payload 20.

FIG. 11 graphically depicts the relationship between the diameter, in inches, of the cylinder 10, on the horizontal scale, and the thrust, in millions of pounds, on the left hand vertical scale. Superimposed on the same graph is the relationship between the diameter of the cylinder 10 and the wall stress, in thousands of p.s.i., on the right hand vertical scale. Imprinted on each of the thrust and wall stress curves, is a number corresponding to the internal pressure for that particular curve, that is the pressure within the cylinder 10 below the compartment 32.

As a point of reference, most high performance rocket engines are capable of producing over 100,000 BTU/second per cubic meter of combustion chamber volume in calorific heat values at temperatures of well over 2,000 degrees Celsius. With the water film cooling provided by the annular water tank 40, ejecting water under high pressure through the annular nozzle assembly 30, steam will be produced at the rate of 2,200 cubic feet for each 100,000 BTU produced. The steam will be generated at 200 p.s.i. and 200 degrees C. (392 degrees F.). This, combined with the desuperheated exhaust gases from the rocket motor 34 will equal 6,000 cubic feet of steam, at 200 p.s.i., each second per 100,000 BTU of rocket fuel burned (66.6 lbs./sec,).

With a launch cylinder 10 of twenty feet diameter (240 in.), with an internal pressure of 200 p.s.i., the thrust developed will be in excess of 9,000,000 pounds. By reference to FIG. 9, the vertical dotted line 80 represents the diameter of the cylinder 10, that is, twenty feet. Of the thrust curves, curves 82 and 84 represent internal stresses of 220 p.s.i. and 180 p.s.i., respectively. The 200 p.s.i. curve, although not shown, by extrapolation, may be seen to fall approximately midway between curves 82 and 84 on the dotted vertical line 80. By moving horizontally to the left from this midpoint, the thrust is determined at approximately 9,000,000 pounds. Correspondingly the wall stress for that internal pressure may be determined by extrapolating between wall stress curves 86 and 88, which correspond to internal pressures of 220 p.s.i. and 180 p.s.i., respectively. At the midpoint between these two curves at the intersections with the dotted vertical line 80, and moving horizontally to the right, it can be determined that the wall stress will be about 33,000 p.s.i.

Space shuttles of today utilize three main rocket engines, each of which produces 375,000 pounds of thrust as a pure rocket engine. By using one of these engines as the actuator rocket motor 34 in the launch system herein described, over 9,000,000 pounds of thrust can be produced at only 65% of the rated power of the engine. With the launch system in accordance with the invention, enough fuel is saved in the launch stage to launch two shuttles into orbit using the same amount of fuel it takes to put one shuttle into orbit today.

In land launches of shuttles as presently practiced, in addition to the solid rocket boosters, one engine of the shuttle is ignited at launch. It takes 9.96 seconds after ignition of the first shuttle main engine for the shuttle to clear the launch tower. By that time, the combined fuel expenditure of the solid rocket boosters and the shuttle main engine is over 100,000 pounds of fuel, corresponding to 150,000,000 BTU's. With the sea launch system of the present invention, seven shuttles could be launched using the same amount of fuel.

As previously described, with the rocket motor 34 actuated, the cooling water from the annular tank 40 is converted to steam along with the sea water 17, and, this combined with the pressurized air within the cylinder 10 below the rocket motor 34, generates thrust for launch. This composite gas temperature to produce an internal pressure of 200 p.s.i. is about 400 degrees F. during the ten to twenty seconds that the rocket motor 34 would fire. The sidewalls of the cylinder 10, thus will not exceed 212 degrees F.

Referring now to FIGS. 6 through 10, the sequence of actuation of the system will now be described. FIG. 6 depicts the payload 20 atop the launch cylinder 10 in a "preparatory to launch" mode. The cylinder 10 is in a vertical position with the payload 20 likewise in a vertical position, with approximately twenty feet of the cylinder 10 above the surface 16 of the water 17. The volume beneath the compartment 32 is pressurized to compensate for the payload 20 and maintain the desired height above sea level 16. The doors 52 of the pressure relief ports 51 are closed. Just prior to ignition, the control valve 42 is opened to initiate transfer of the high pressure helium from tank 44 to cooling tank 40 to dispense a film of cooling water through nozzle assembly 50 into the cylinder 10 below the lower wall structure 30 of chamber 32. The rocket motor 34 within the cylinder 20 is then activated, and hot gases from the rocket motor create expanding pressure within the space above the water surface within the cylinder 10. The cylinder 10, along with the payload 20 begins to lift as steam from the heated sea water and cooling water also expands. The captured pressure within the cylinder releases enough thrust to lift millions of pounds. This lifting of the payload 20 is depicted in FIGS. 7 and 8.

During this lifting, the pressure of the surrounding sea water 17 operating against the adjacent surface of the launch cylinder 10 provides directional stability to the upward vertical movement of the launch cylinder 10 along with the rocket system's payload 20.

At the predetermined altitude, generally corresponding to where the cylinder 10 is about three-quarters of its length out of the sea 17, a sequence of events is initiated for the braking procedure. The firing of the rocket motor 34 ceases. The band 56 is released by triggering of the shaped charges attached thereto, thus enabling the opening of the doors 52 of the pressure relief ports 51 to the position shown in FIG. 5. The solid rocket boosters 22 and 23 are fired, along with the main motors of spacecrafts 24 and 25. As the pressure relief ports 51 are opened, allowing the gases from within the interior of cylinder 10 to escape in an upward circumferential direction, as depicted in FIG. 5, thus bathing the ablative shield 33 in a blanket of relatively cool expanded gas, that is, cool relative to the heat of the exhaust gases of the now burning rockets of the payload 20. These upwardly directed expanded gases also serve to deflect the exhaust gases of the now burning payload rockets away from the exterior of the shield 33. In normal usage, the shield 33 may serve for three or four launches, after which it will be replaced. As the payload 20 is disengaged from the launch cylinder 10, as depicted in FIG. 8, the guidance systems of the payload 20 will take over. Upon separation, the combination of aerodynamic drag, the drag of the sea 17, as well as the weight of the cylinder 10 slows the rate of ascent of the cylinder 10. Further braking of the upward ascent is effected by momentary firing of the reverse thrust rockets within the subhousings 74. The sea chutes 70 and 72 are deployed, or alternatively flare pods at the trailing end 14 of the cylinder 10 may be utilized.

In any event, in the majority of launches, it is desirable to reverse the direction of the cylinder 10 prior to its total emergence from the surface 16 of the sea 17. The combination of the actuation of the pressure relief doors 52, the firing of the rockets of the payload 20, and the cessation of ignition of the rocket motor 34 effects rapid separation. This position is depicted in FIG. 9, at which point the cylinder 10, with a length of 4,250 feet, has approximately 3,000 feet thereof above the surface 16 of the sea 17.

As the cylinder 10 comes to a halt at its maximum altitude, a partial vacuum is formed within the cylinder 10, and it begins its downward descent to slide back into the sea 17, as shown in FIG. 10, with the changing volume within the cylinder producing a change in pressure to assist in regulating the descent. The pneumatic actuators 54 are controlled to effect the closing of the pressure relief doors 52 upon descent, to assist in controlling the rate of descent. A parachute package is deployed from one or more of the sub-housings 74, to assit in controlling the rate of descent, thereby allowing the cylinder 10 to slip back easily into the sea 17 in a substantially vertical direction.

While the above description has proceeded with reference to launch of shuttle spacecraft 24, 25 into earth orbit, the launch system may be utilized for suborbital launching of missiles from the sea, and used as a means for preserving the on-board rocket fuel to provide maximum range of such missiles. It is to be understood, that as used herein, the term spacecraft includes surface to air missiles, and with appropriate dimensional and other adjustments, can readily accommodate a launch of ICBM's. Furthermore, the launch system of the present invention may be used to launch the cylinder 10, itself, into space for the use thereof in the construction of space platforms, in which event, separation of the cylinder 10 from the payload 20 is not required. In this instance, the launch would continue, as depicted in FIG. 7, that is, the cylinder 10 would be launched into space along with the spacecraft payload 20.

While there has been shown and described a preferred embodiment, it is to be understood that various other adaptations and modifications may be made within the spirit and scope of the invention.

I claim:

1. In a system for launching from the sea, to a predetermined altitude or speed, a spacecraft means or the like having propulsion means attached thereto, the combination comprising:
   a launch cylinder having a first end and a second open end and having a buoyancy sufficient to enable at least a portion of said first end thereof to extend above the surface of the sea with said cylinder in a generally vertical position;
   compartment means within said cylinder adjacent said first end;
   means on said first end of said cylinder for supporting said spacecraft means in a generally vertical direction above said compartment means; and
   rocket propulsion means within said compartment means, said compartment means having an opening for discharge of exhaust gases from said propulsion means into the space of said cylinder therebelow for confining said exhaust gases and for enabling said exhaust gases to generate steam from the sea water below said space for generating pressure within the space between said compartment means and the sea for launching said spacecraft means and said cylinder from the sea into the atmosphere.

2. The combination according to claim 1 wherein said compartment means includes an inverted dome-shaped lower wall portion extending across said cylinder, and said opening is in said lower wall.

3. The combination according to claim 1 further including means for enabling pressurization of the space below said compartment means for compensating for the weight of said spacecraft means on said cylinder for enabling the upper portion of said cylinder to remain above the surface of the sea.

4. The combination according to claim 1 further including water cooling means within said compartment means for selectively discharging water onto the walls of said cylinder below said compartment means during firing of said propulsion means for enabling cooling of said walls and for enabling further generation of steam from the discharged water during firing of said propulsion means.

5. The combination according to claim 4 further including means for enabling separation of said spacecraft means and said cylinder upon firing of the propulsion means of said spacecraft means.

6. The combination according to claim 5 wherein said means for enabling separation includes pressure relief means in said cylinder below said compartment means for decelerating said cylinder.

7. The combination according to claim 6 wherein said pressure relief means includes door means hingedly coupled to said cylinder and means for maintaining said door means in a closed position during firing of said rocket propulsion means and for opening said door means upon separation.

8. The combination according to claim 7 wherein said door means are hingedly coupled at the bottom thereof and serve to direct gases from within the cylinder upwardly upon opening.

9. The combination according to claim 8 wherein said cylinder includes ablative shield means on the portion thereof above said door means.

10. In a system for launching from the sea, to a predetermined altitude or speed, a spacecraft means or the like having propulsion means attached thereto, the combination comprising:
   a launch cylinder having a length at least equal to the altitude to which said spacecraft means is to be lifted prior to ignition of the propulsion means thereof, said cylinder having an open end and having a buoyancy sufficient to enable at least a portion thereof to extend above the surface of the sea with said cylinder in a generally vertical position with said open end at the bottom thereof;
   means on the other end of said cylinder for supporting said spacecraft means in a generally vertical direction;
   propulsion means within said portion adjacent said other end;

means for enabling separation of said spacecraft means from said other end upon ignition of the propulsion means of said spacecraft means; and means for enabling gradual descent of said cylinder into the sea after such separation.

11. The combination according to claim 10 wherein said cylinder includes fin means adjacent the open end thereof.

12. The combination according to claim 10 wherein said means for enabling separation includes pressure relief means in said cylinder operative prior to emergence of the open end of said cylinder from the sea.

13. The combination according to claim 10 wherein said means for enabling separation of said spacecraft means includes means on said cylinder for braking the acceleration thereof.

14. The combination according to claim 13 wherein said means for braking the acceleration includes reverse rocket means.

15. The combination according to claim 13 wherein said means for braking the acceleration includes sea chute means.

16. The combination according to claim 13 wherein said means for enabling gradual descent of said cylinder includes deployable parachute means.

17. The combination according to claim 10 wherein the propulsion means within said launch cylinder includes gas generating means.

18. The combination according to claim 17 wherein said gas generating means have the gases thereof directed toward the sea water and said system further includes means adjacent said other end of said launch cylinder coacting with said gas generating means for confining the gases therebelow.

19. The combination according to claim 18 wherein said gas generating means includes a rocket motor with exhaust nozzle means.

20. The combination according to claim 19 wherein said means for confining includes an inverted pressure dome means extending between the exhaust nozzle means of said rocket motor and the interior of said launch cylinder.

21. In a method for boosting a spacecraft means or the like to a predetermined elevation from the surface of the sea prior to ignition of the propulsion means attached to said spacecraft means, the method comprising:

providing an at least partially buoyant cylinder with an open end in the sea for positioning in a generally vertical position with the open end below the surface and a portion thereof above the surface;

supporting a spacecraft means on the end of said portion of said cylinder in a generally vertical position;

igniting propulsion means within said portion for causing the lifting and acceleration of said cylinder and said spacecraft means as a unit;

causing separation of said cylinder and said spacecraft means at a predetermined altitude;

decelerating said cylinder upon separation; and controlling the descent of said cylinder under the force of gravity into the sea.

22. The method according to claim 21 wherein the step of causing separation is accomplished prior to emergence of the other end of said cylinder from the sea.

23. The method according to claim 22 wherein the step of decelerating is accomplished prior to emergence of the other end of said cylinder from the sea for precluding emergence of said cylinder from the sea.

24. The method according to claim 21 wherein said propulsion means is a gas generating means, and said method includes the step of confining the gases from said gas generating means therebelow during said lifting and acceleration.

25. The method according to claim 24 wherein said gas generating means includes rocket motor means.

26. A method for launching a spacecraft from the sea comprising the steps of:

providing an at least partially buoyant cylinder in the sea for positioning in a generally vertical position with an open end of the cylinder below the surface and a portion thereof above the surface;

supporting a spacecraft means on the end of said portion of said cylinder in a generally vertical position above the surface of the sea;

pressurizing the cylinder in the space intermediate the spacecraft and the sea water therebelow to compensate for the weight of the spacecraft;

igniting a rocket propulsion means within said portion of the cylinder; and directing the rocket gases from the so-ignited propulsion means in a downward axial direction within said cylinder toward the surface of the sea water within said cylinder for causing gas generation including the generation of steam from the sea water to cause lifting of said cylinder and said spacecraft means as a unit upwardly.

27. The method of claim 26 further including the step of providing cooling water to the walls of said cylinder in proximity to the rocket gases from said propulsion means for cooling the walls and for enabling generation of the cooling water into steam.

28. The method according to claim 26 further including the step of selectively separating the cylinder from the spacecraft at a point in time after firing of the rocket propulsion means.

29. The method according to claim 28 further including the step of decelerating said cylinder upon separation.

30. The method according to claim 29 further including the step of controlling the descent of said cylinder back into the sea.

31. The method according to claim 30 wherein said step of decelerating said cylinder is accomplished prior to emergency of the open end of the cylinder from the sea.

32. In a system for launching from the sea, to a predetermined altitude or speed, a spacecraft means or the like having propulsion means attached thereto, the combination comprising:

a launch cylinder having a first end and a second open end and having a buoyancy sufficient to enable at least a portion of said first end thereof to extend above the surface of the sea with said cylinder in a generally vertical position;

means within said cylinder adjacent said first end for supporting rocket propulsion means therein;

means on said first end of said cylinder for supporting said spacecraft means in a generally vertical direction above said compartment means; and means for confining the discharge of exhaust gases from said propulsion means into the space of said cylinder therebelow for enabling the generation of thrust from said exhaust gases and the generation of steam from the sea water below said space for launching said spacecraft means and said cylinder from the sea into the atmosphere.

33. The combination according to claim 32 further including means for selectively discharging water onto the walls of said cylinder in proximity to said propulsion means during firing of said propulsion means for enabling cooling of said walls and for enabling further generation of steam from the discharged water during firing of said propulsion means.

34. The combination according to claim 32 further including means for enabling separation of said spacecraft means and said cylinder upon firing of the propulsion means of said spacecraft means.

35. The combination according to claim 34 wherein said means for enabling separation includes pressure relief means in said cylinder below said compartment means for decelerating said cylinder.

36. The combination according to claim 35 wherein said pressure relief means includes door means hingedly coupled to said cylinder and means for maintaining said door means in a closed position during firing of said rocket propulsion means and for opening said door means upon separation.

37. An arrangement for launching a tubular member to a location above the earth comprising:
   an elongated tubular member having a first end and a second end, and having sufficient buoyancy to float in water with said first end adjacent the surface of said water and said tubular member in a substantially vertical orientation;
   rocket propulson means;
   means for connecting said rocket propulsion means to said first end of said tubular member so that exhaust gases from said rocket propulsion means are directed from said first end toward said second end of said tubular member; and
   means for confining said exhaust gases at said first end for causing said exhaust gases to be directed against the surface of water in said tubular member for creating a reaction to assist said exhaust gases in propelling said tubular member upwardly out of said water.

38. The arrangement according to claim 37 in which said tubular member has less buoyancy adjacent said second end than it does remote from said second end for causing said tubular member to achieve said substantially vertical orientation.

* * * * *

UNITED STATES PATENT AND TRADEMARK OFFICE
CERTIFICATE OF CORRECTION

PATENT NO. : 4,724,738

DATED : Feb. 16, 1988

INVENTOR(S) : Don E. Johnson

It is certified that error appears in the above-identified patent and that said Letters Patent is hereby corrected as shown below:

In claim 31 (column 12, line 48), "emergency" should read ---emergence---.

Signed and Sealed this

Fifth Day of July, 1988

Attest:

DONALD J. QUIGG

Attesting Officer

Commissioner of Patents and Trademarks